United States Patent
Jeong et al.

(10) Patent No.: US 7,643,889 B2
(45) Date of Patent: Jan. 5, 2010

(54) CIRCUIT AND METHOD OF OUTPUTTING TEMPERATURE DATA OF SEMICONDUCTOR MEMORY APPARATUS

(75) Inventors: Chun-Seok Jeong, Gyeonggi-do (KR); Kang-Seol Lee, Gyenoggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 210 days.

(21) Appl. No.: 11/819,423

(22) Filed: Jun. 27, 2007

(65) Prior Publication Data

US 2008/0091378 A1  Apr. 17, 2008

(30) Foreign Application Priority Data

Oct. 12, 2006  (KR) .................. 10-2006-0099180

(51) Int. Cl.
  *G05B 15/00* (2006.01)
  *G05B 11/01* (2006.01)
  *G05D 23/00* (2006.01)

(52) U.S. Cl. ............... 700/1; 700/12; 700/299; 324/224; 326/282; 326/30; 326/82; 331/76; 365/193; 365/189.3; 365/200; 365/212

(58) Field of Classification Search ......... 700/1, 700/12, 299; 324/224; 331/76; 365/193–194, 365/189.3, 200, 212; 326/28, 30, 82
  See application file for complete search history.

(56) References Cited

U.S. PATENT DOCUMENTS

| | | | |
|---|---|---|---|
| 6,433,615 B2* | 8/2002 | Nagano et al. ............. | 327/513 |
| 6,928,007 B2 | 8/2005 | Jin | |
| 6,980,020 B2 | 12/2005 | Best et al. | |
| 7,019,555 B2 | 3/2006 | Lee | |
| 7,034,565 B2 | 4/2006 | Lee | |
| 7,064,989 B2 | 6/2006 | Na et al. | |
| 7,216,554 B2* | 5/2007 | Morikawa ................ | 73/862.68 |
| 7,313,044 B2* | 12/2007 | Fuhrmann et al. .......... | 365/211 |
| 2002/0158700 A1* | 10/2002 | Nemoto .................... | 331/158 |
| 2003/0086476 A1* | 5/2003 | Mizuta ..................... | 374/178 |
| 2004/0100837 A1 | 5/2004 | Lee | |
| 2005/0141311 A1* | 6/2005 | Kim et al. ................. | 365/222 |
| 2005/0160841 A1* | 7/2005 | Morikawa ................ | 73/866.1 |
| 2005/0174164 A1* | 8/2005 | Fuhrmann et al. .......... | 327/536 |
| 2006/0098509 A1* | 5/2006 | Kim ......................... | 365/212 |
| 2008/0061899 A1* | 3/2008 | Stolpman ................. | 331/176 |

FOREIGN PATENT DOCUMENTS

| | | |
|---|---|---|
| JP | 09-297623 | 11/1997 |
| JP | 2004310981 | 11/2004 |
| JP | 2005228458 | 8/2005 |
| KR | 1020040013885 | 2/2004 |
| KR | 1020050082585 | 8/2005 |
| KR | 1020070036648 | 4/2007 |

* cited by examiner

*Primary Examiner*—Ramesh B Patel
(74) *Attorney, Agent, or Firm*—Venable LLP; Jeffrei A. Kaminski (57) ABSTRACT

A circuit for outputting temperature data of a semiconductor memory apparatus includes a temperature detecting circuit that generates a temperature voltage corresponding to a change in temperature and outputs the temperature voltage, an A/D converter that converts the temperature voltage into a first temperature code and outputs it, and a temperature data correcting unit that outputs a second temperature code obtained by correcting an error of the first temperature code using a correction code.

43 Claims, 4 Drawing Sheets

CIRCUIT AND METHOD OF OUTPUTTING TEMPERATURE DATA OF SEMICONDUCTOR MEMORY APPARATUS

CROSS-REFERENCE TO RELATED PATENT APPLICATION

This application claims the benefit of Korean Patent Application No. 10-2006-0099180, filed on Oct. 12, 2006, in the Korean Intellectual Property Office, the disclosure of which is incorporated herein in its entirety by reference.

BACKGROUND OF THE INVENTION

1. Technical Field

Embodiments of the present invention relate to a semiconductor memory apparatus, and more particularly, to a circuit and method of outputting temperature data of a semiconductor memory apparatus.

2. Related Art

Figure 1:
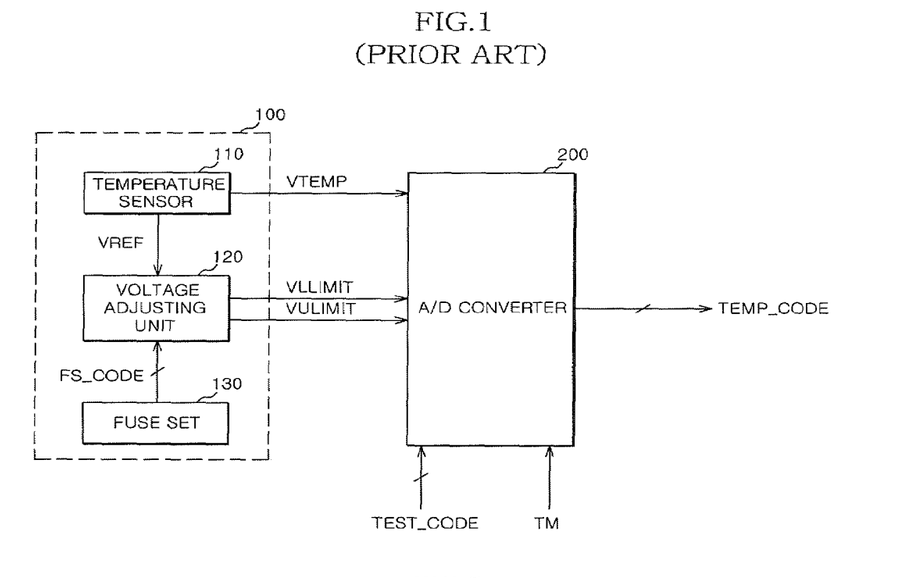
FIG. 1 is a block diagram of a circuit for outputting temperature data of a semiconductor memory apparatus according to the related art.

As shown in FIG. 1, a circuit for outputting temperature data of a semiconductor memory apparatus according to the related art includes a temperature detecting circuit (Band Gap Reference Circuit) 100 and an A/D converter 200.

The temperature detecting circuit 100 may use a band gap reference circuit, and has a structure which includes a temperature sensor 110, a voltage adjusting unit 120, and a fuse set 130.

The temperature sensor 110 outputs a temperature voltage VTEMP that is inversely proportional to an internal temperature of a semiconductor memory apparatus by using temperature characteristics of a bipolar junction transistor (BJT), and a first reference voltage VREF that is constant without depending on a change in temperature.

The voltage adjusting unit 120 distributes the first reference voltage VREF by using a plurality of resistors, and outputs second reference voltages VULIMIT and VLLIMIT that determine an upper limit and a lower limit of the temperature voltage VTEMP. At this time, the plurality of resistors include variable resistors, and resistance values of the variable resistors vary according to a fuse code (FS_CODE) value.

The fuse set 130 includes a plurality of fuses, and outputs the fuse code FS_CODE to the voltage adjusting unit 120 according to cutting states of the fuses.

Figure 2:
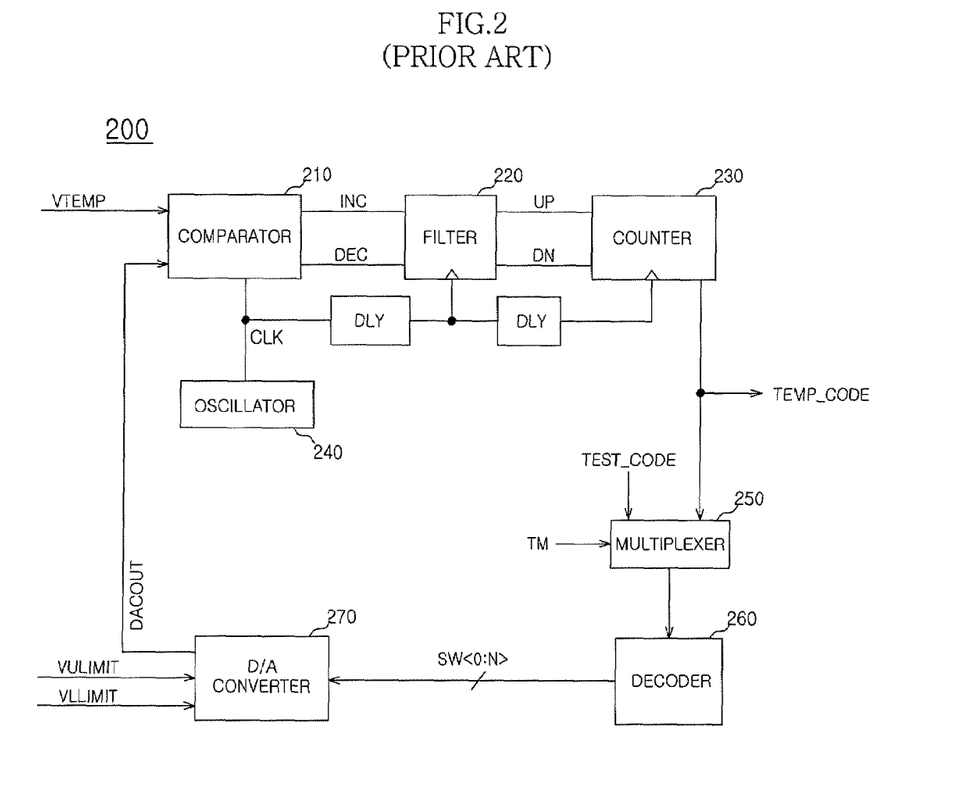
FIG. 2 is a block diagram of an A/D converter shown in FIG. 1.

The A/D converter 200 converts the temperature voltage VTEMP into a temperature code TEMP_CODE of a digital format and outputs it. As shown in FIG. 2, the A/D converter 200 includes a comparator 210, a filter 220, a counter 230, an oscillator 240, a multiplexer 250, a decoder 260, and an A/D converter 270. The comparator 210 compares the temperature voltage VTEMP and an analog voltage DACOUT output by the D/A converter 270 and outputs compared result signals INC and DEC. When values of the comparison result signals INC and DEC extremely fluctuate (that is, the comparison result signals INC and DEC include high frequency components), due to an external noise, the filter 220 does not allow the comparison result signals INC and DEC to be output. In contrast, when the values of the comparison result signals INC and DEC rarely fluctuate (that is, the comparison result signals INC and DEC include only low frequency components), the filter 220 outputs counting signals UP and DN for performing an up counting operation and a down counting operation of the counter 230. The counter 230 increases or decreases a value of an initial temperature code TEMP_CODE (for example, 100000) according to the counting signals UP and DN and outputs it. The oscillator 240 generates a clock signal CLK having a predetermined cycle and supplies the clock signal CLK to the filter 220 and the counter 230 through a delay element DLY. The multiplexer 250 outputs a test code signal TEST_CODE or the temperature code TEMP_CODE according to a test mode signal TM. The decoder 260 outputs a decoding signal SW<0:N> that is obtained by decoding the output of the multiplexer 250. The D/A converter 270 converts the decoding signal SW<0:N> into the analog voltage DACOUT in a range of voltage levels of the second reference voltages VULIMIT and VLLIMIT and outputs it.

The operation of the circuit for outputting temperature data of the semiconductor memory apparatus according to the related art that has the above-described structure will now be described.

The temperature detecting circuit 100 operates to perform temperature detection, and outputs the temperature voltage VTEMP and the second reference voltages VULIMIT and VLLIMIT.

The A/D converter 200 performs a tracking operation for searching the temperature code TEMP_CODE that corresponds to the temperature voltage VTEMP by using the temperature voltage VTEMP and the second reference voltage VULIMIT and VLLIMIT.

If a voltage level of the analog voltage DACOUT of the D/A converter 270 that has converted the output of the counter 230 into the analog voltage becomes equal to a voltage level of the temperature voltage VTEMP, the tracking operation is completed. Therefore, the A/D converter 200 outputs a final temperature code TEMP_CODE. The final temperature code TEMP_CODE is stored in a separate register (not shown), and is used in a structure where the final temperature code TEMP_CODE is needed, among inner or outer structures of the semiconductor memory apparatus.

It is possible to perform a test mode to determine whether the circuit for outputting temperature data of the semiconductor memory apparatus according to the related art accurately operates.

After the internal temperature of the semiconductor memory apparatus is adjusted to a specified temperature that corresponds to the test code signal TEST_CODE, the test mode signal TM is enabled.

If the test mode signal TM is enabled, the multiplexer 250 selects the temperature code TEMP_CODE instead of the output of the counter 230 and outputs it to the decoder 260. The output of the decoder 260 is converted into the analog voltage DACOUT by the D/A converter 270 and is then input to the comparator 210.

If the temperature code TEMP_CODE that is output through the filter 220 and the counter 230 is not same as the test code signal TEST_CODE, an error exists during the output of the circuit for outputting temperature data.

The reason why the error occurs during the output of the circuit for outputting temperature data is due to an offset that exists in the second reference voltages VULIMIT and VLLIMIT which determines an output range of the D/A converter 270. That is, a voltage level of at least one of the second reference voltages VULIMIT and VLLIMIT is larger or smaller than a required voltage level.

Accordingly, the fuse that is included in the fuse set 130 of the temperature detecting circuit 100 is selectively cut so as to change the fuse code FS_CODE, and accordingly, the temperature code TEMP_CODE is monitored by changing the voltage levels of the second reference voltages VULIMIT and VLLIMIT. That is, by repeating this process, it is possible to reduce the error that occurs in the circuit for outputting temperature data.

However, the circuit for outputting temperature data of the semiconductor memory apparatus according to the related art has the following problems.

First, since it is not possible to know a fuse code value that enables the output of the desired second reference voltages VULIMIT and VLLIMIT, the fuse code value is changed stepwise so as to approximate the desired reference voltages, which does not accurately correct the error in the circuit for outputting temperature data.

Second, since fuse cutting and monitoring of the output value need to be repeatedly performed so as to allow the desired second reference voltages VULIMIT and VLLIMIT to be output, a correction process is inconvenient and a process time is increased.

Third, because of a characteristic of an analog method that adjusts the second reference voltages VULIMIT and VLLIMIT through the fuse cutting, even if the correction process is completed, the difference between the amounts of unit voltages increased (resolution) in the reference voltages, and an error in the circuit for outputting temperature data occurs due to a change in a specified temperature for performing a test may still exist. Accordingly, even though the above-described correction process is repeated, it is possible to remove the error in the circuit securely for outputting temperature data.

SUMMARY OF THE INVENTION

Embodiments of the present invention may provide a circuit and method of outputting temperature data of a semiconductor memory apparatus that is capable of securely removing an output error. Another embodiment of the present invention provides a circuit and method of outputting temperature data of a semiconductor memory apparatus that may be capable of simply and quickly performing error correction.

A first embodiment of the present invention may provide a circuit for outputting temperature data of a semiconductor memory apparatus. The circuit may include a temperature detecting circuit that may generate a temperature voltage corresponding to a change in temperature and outputs the temperature voltage, an A/D converter that may convert the temperature voltage into a first temperature code and output it, and a temperature data correcting unit that may output a second temperature code obtained by correcting an error of the first temperature code using a correction code.

A second embodiment of the present invention may provide a circuit for outputting temperature data of a semiconductor memory apparatus. The circuit may include a temperature detecting circuit that may generate a temperature voltage corresponding to a change in temperature and outputs the temperature voltage, and correct an output voltage level of the temperature detecting circuit according to an adjustment code input from the outside, an A/D converter that may convert the temperature voltage into a first temperature code and output it, and output the adjustment code to the temperature detecting circuit in accordance with a predetermined control signal, and a temperature data correcting unit that may output a second temperature code obtained by correcting an error of the first temperature code using a correction code.

A third embodiment of the present invention may provide a method of outputting temperature data of a semiconductor memory apparatus. The semiconductor memory apparatus may include a temperature detecting circuit that may output a temperature voltage corresponding to a change in temperature and a reference voltage setting a range for converting the temperature voltage into a first temperature code and an A/D converter that may convert the temperature voltage into the first temperature code by using the reference voltage. The method may include creating a correction code for correcting an error of the first temperature code by using the first temperature code and a test code set in advance, and outputting a second temperature code obtained by operating the first temperature code and the correction code.

A fourth embodiment of the present invention may provide a method for outputting temperature data of a semiconductor memory apparatus. The semiconductor memory apparatus may include a temperature detecting circuit that may output a temperature voltage corresponding to a change in temperature and a reference voltage setting a range for converting the temperature voltage into a first temperature code, and an A/D converter that may change a value of a digital code such that an analog voltage, which is obtained by converting the temperature voltage into the digital code and converting the digital code by using the reference voltage, is the same as the temperature voltage, and output the digital code as the first temperature code. The method may include changing the first temperature code such that an analog voltage obtained by converting a test code is the same as the temperature voltage, and changing the reference voltage by using the changed first temperature code such that the analog voltage is changed so as to correct the first temperature code, and creating a correction code for correcting an error of the first temperature code by using the first temperature code and the test code and correcting the first temperature code as a second temperature code by using the correction code. The second temperature code may be output by selectively performing the changing of the first temperature code and the changing of the reference voltage, and the creating of the correction code and the correcting of the first temperature code as the second temperature code.

DESCRIPTION OF EXEMPLARY EMBODIMENTS

Embodiments of the invention will now be described in detail with reference to the accompanying drawings.

Figure 3:
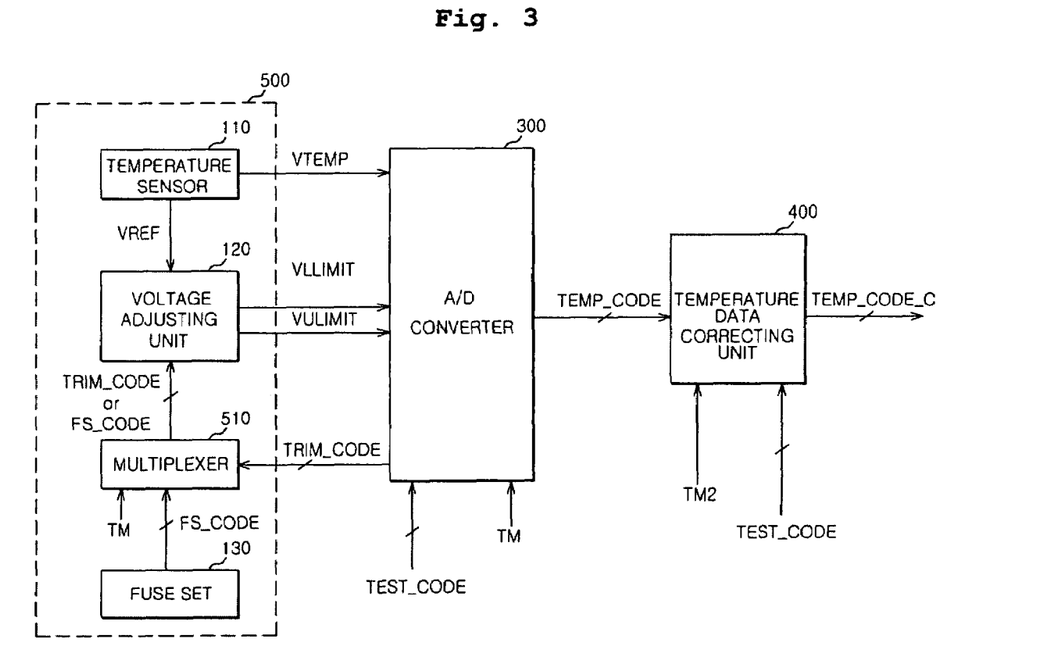
FIG. 3 is a block diagram of a circuit for outputting temperature data of a semiconductor memory apparatus according to an embodiment of the present invention.

As shown in FIG. 3, an exemplary circuit for outputting temperature data of a semiconductor memory apparatus according to an embodiment of the present invention may include a temperature detecting circuit 500, an A/D converter 300, and a temperature data correcting unit 400.

The temperature detecting circuit 500 may be constructed such that the temperature detecting circuit 500 generates and outputs a temperature voltage VTEMP corresponding to a change in temperature and corrects an output voltage level thereof according to an adjustment code TRIM_CODE.

The A/D converter 300 may convert the temperature voltage VTEMP into the temperature code TEMP_CODE and output it, and output the temperature code TEMP_CODE as the adjustment code TRIM_CODE to the temperature detecting circuit 500 during a first test mode interval in accordance with a predetermined control signal, that is, a first test mode signal TM.

The temperature data correcting unit 400 may generate a correction code FS2_CODE during a second test mode interval, and output a second temperature code TEMP_CODE_C that may be obtained by correcting an error of the temperature code TEMP_CODE using the generated correction code FS2_CODE.

The temperature detecting circuit 500 may use a band gap reference circuit, and may include a temperature sensor 110, a voltage adjusting unit 120, a fuse set 130, and a multiplexer 510.

The temperature sensor 110 may output a temperature voltage VTEMP that is inversely proportional to an internal temperature of the semiconductor memory apparatus and a first reference voltage VREF that is constant without depending on a change in temperature. The voltage adjusting unit 120 may distribute the first reference voltage VREF by using a plurality of resistors and output second reference voltages VULIMIT and VLLIMIT for determining an upper limit and a lower limit of the temperature voltage. In addition, the voltage adjusting unit 120 may adjust voltage levels of the second reference voltages VULIMIT and VLLIMIT according to the adjustment code TRIM_CODE. The fuse set 130 may include a plurality of fuses, and output a fuse code FS_CODE for adjusting resistance values of the plurality of resistors according to cutting states of the fuses. In accordance with the first test mode signal TM, the multiplexer 510 may select either the fuse code FS_CODE or the adjustment code TRIM_CODE and output it to the voltage adjusting unit 120.

Figure 4:
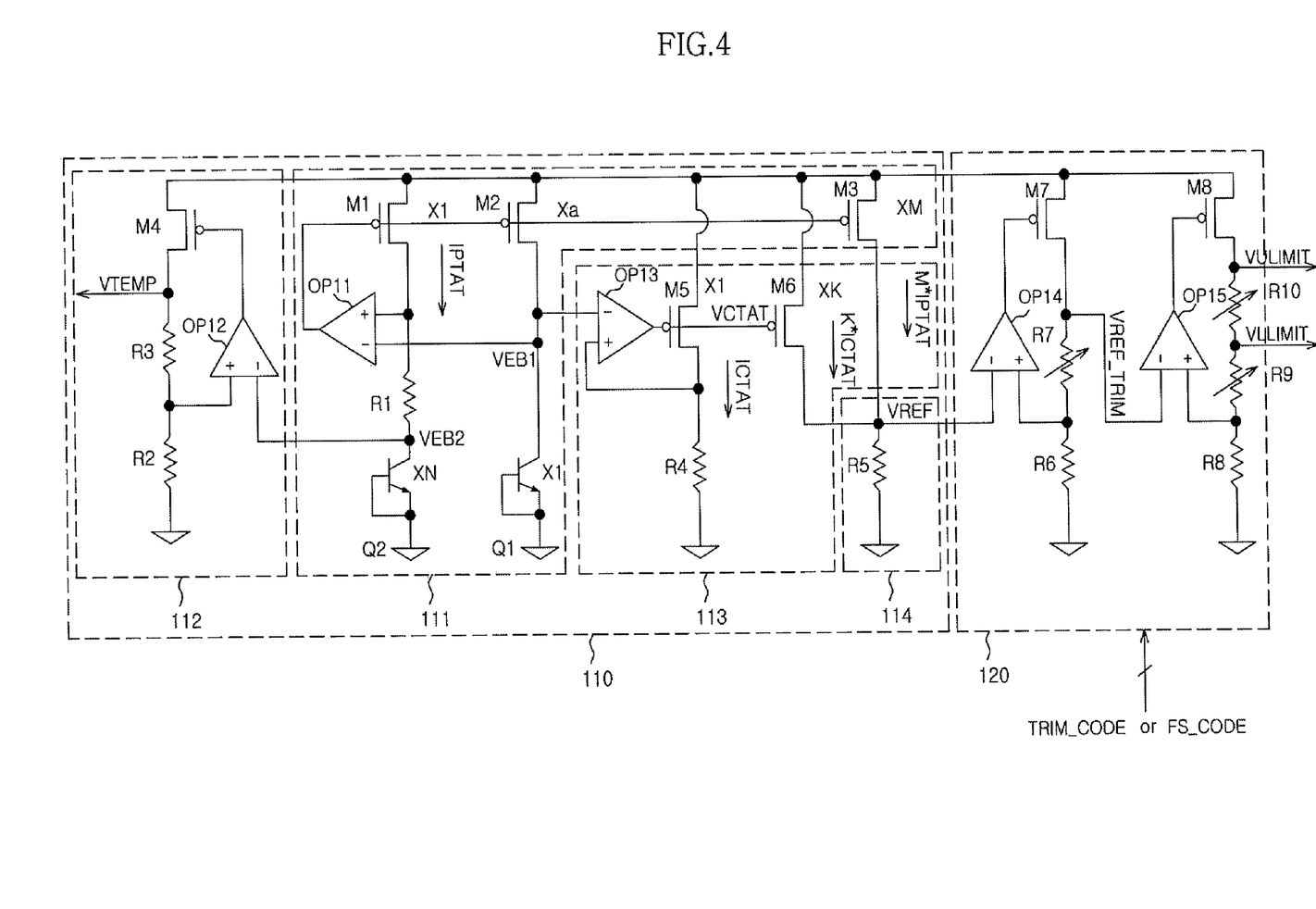
FIG. 4 is a circuit diagram of an exemplary temperature sensor and voltage adjusting unit shown in FIG. 3.

As shown in FIG. 4, the exemplary temperature sensor 110 may include a temperature-proportional current generating unit 111 that may generate a current, which is proportional to a change in temperature, through a plurality of current paths, a temperature voltage output unit 112 that may output the temperature voltage VTEMP corresponding to a change in temperature by using a temperature coefficient characteristic voltage of the temperature-proportional current generating unit 111, a temperature-inversely proportional current generating unit 113 that may generate a current, which is inversely proportional to a change in temperature, through a plurality of current paths, and a current/voltage converter 114 that may generate the first reference voltage VREF, which is constant without depending on a change in temperature, by using the current generated by the temperature-proportional current generating unit 111 and the current generated by the temperature-inversely proportional current generating unit 113.

The exemplary temperature-proportional current generating unit 111 may include a first transistor group that may include transistors M1 to M3, each of which may be composed of, for example, a FET (Field Effect Transistor) having a source connected to a power supply terminal, a second transistor group that includes transistors Q1 and Q2, each of which may be composed of, for example, a diode-connected bipolar junction transistor (BJT) that is connected between each of the transistors M1 and M2 among the transistors M1 to M3 in the first transistor group and a ground terminal and has a negative temperature coefficient characteristic, and a differential amplifier OP11 serving as a current controller that amplifies the difference between emitter-base voltages VEB1 and VEB2 in the transistors Q1 and Q2 of the second transistor group and commonly applies the amplified voltage to gates of the first transistor group including the transistors M1 to M3 so as to control the amount of current flowing through the transistors M1 to M3 in the first transistor group.

At this time, each of the transistors M1 to M3 in the first transistor group and the transistors Q1 and Q2 in the second transistor group may be designed to have a different size so as to have predetermined magnification, and an example of the corresponding magnification is displayed at a right side of each of the transistors shown in FIG. 4. That is, when it is assumed that a magnification of the transistor M1 is a basic magnification X1, Xa is "a" times larger than X1, and XM is M times larger than X1. Therefore, the amount of current that flows through the transistor M1 having the magnification X1 becomes IPTAT, and the amount of current that flows through the transistor M3 having the magnification XM becomes M*IPTAT. In addition, the emitter-base voltages of the transistors Q1 and Q2, which is included in the second transistor group and each of which is composed of the diode-connected BJT, may have negative temperature coefficient characteristics. That is, the voltage is decreased when the temperature is increased.

The temperature voltage output unit 112 may include a transistor M4 whose source is connected to the power supply terminal, distribution resistors R2 and R3 that are coupled between a drain of the transistor M4 and a ground terminal, and a differential amplifier OP12 serving as a current controller that amplifies the difference between a voltage distributed by the distribution resistors R2 and R3 and the emitter-base voltage VEB2 and applies the amplified voltage to a gate of the transistor M4 so as to control the amount of current flowing through the transistor M4. At this time, the temperature voltage VTEMP may be output at a connecting node between the transistor M4 and the resistor R3.

The temperature-inversely proportional current generating unit 113 may include a plurality of transistors M5 and M6, each of which has a source connected to the power supply terminal, and a differential amplifier OP13 serving as a current controller that amplifies the difference between a voltage according to the current flowing through the transistor M5 and the emitter-base voltage VEB1 and commonly applies the amplified voltage to the gates of the plurality of transistors M5 and M6 so as to control the amount of current that flows through the plurality of transistors M5 and M6. At this time, each of the transistors M5 and M6 may be designed to have a different size so as to have predetermined magnification, and an example of a corresponding magnification is displayed at a right side of each transistor.

The current/voltage converter 114 may be composed of a resistor R5 that is commonly connected to one of the current paths of the temperature-proportional current generating unit 111 and one of the current paths of the temperature-inversely proportional current generating unit 113. At this time, the two current paths, which are commonly connected to the resistor R5, may be selectively coupled such that the sum of the currents that flow through the two current paths are constant without depending on a change in temperature. That is, the current/voltage converter 114 may be composed of the resistor R5 that has one end commonly electrically coupled to the drains of the transistors M3 and M6 and the other end electrically coupled to a ground, and the first reference voltage VREF is output at connecting nodes between the drains of the transistors M3 and M6 and the resistor R5. At this time, since the first reference voltage VREF affects the output of the circuit for outputting temperature data, the first reference voltage VREF should be constantly maintained without depending on a change in PVT (Process, Voltage, and Temperature). Accordingly, the magnifications of the two transistors M3 and M6 may be defined as XM and XK such that the change in the amount of current is the same in each of the transistors M3 and M6.

As shown in FIG. 4, the voltage adjusting unit 120 may include a first transistor M7 whose source is electrically coupled to the power supply terminal, first distribution resistors R6 and R7 that may be electrically coupled between the first transistor M7 and a ground terminal, a differential amplifier OP14 serving as a first current controller that amplifies the difference between a voltage distributed by the first distribution resistors R6 and R7 and the first reference voltage VREF and applies the amplified voltage to a gate of the first transistor M7 so as to control the amount of current flowing through the first transistor M7, a second transistor M8 whose source is electrically coupled to the power supply terminal, second distribution resistors R8 to R10 that are electrically coupled between the second transistor M8 and a ground terminal, and a differential amplifier OP15 serving as a second current controller that amplifies the difference between a voltage VREF_TRIM at connecting nodes between the first transistor M7 and the first distribution resistors R6 and R7 and a voltage distributed by the second distribution resistors R8 to R10 and applies the amplified voltage to a gate of the second transistor M8 so as to control the amount of current flowing through the second transistor M8. At this time, the second reference voltages VULIMIT and VLLIMIT are output at a connecting node between the second transistor M8 and the resistor R10 and a connecting node between the resistors R9 and R10, respectively. If resistance values of the variable resistors R9 and R10 among the variable resistors R7, R9, and R10 are adjusted by using the fuse code FS_CODE or the adjustment code TRIM_CODE, it is possible to adjust voltage levels of the second reference voltages VLLIMIT and VULIMIT.

Figure 5:
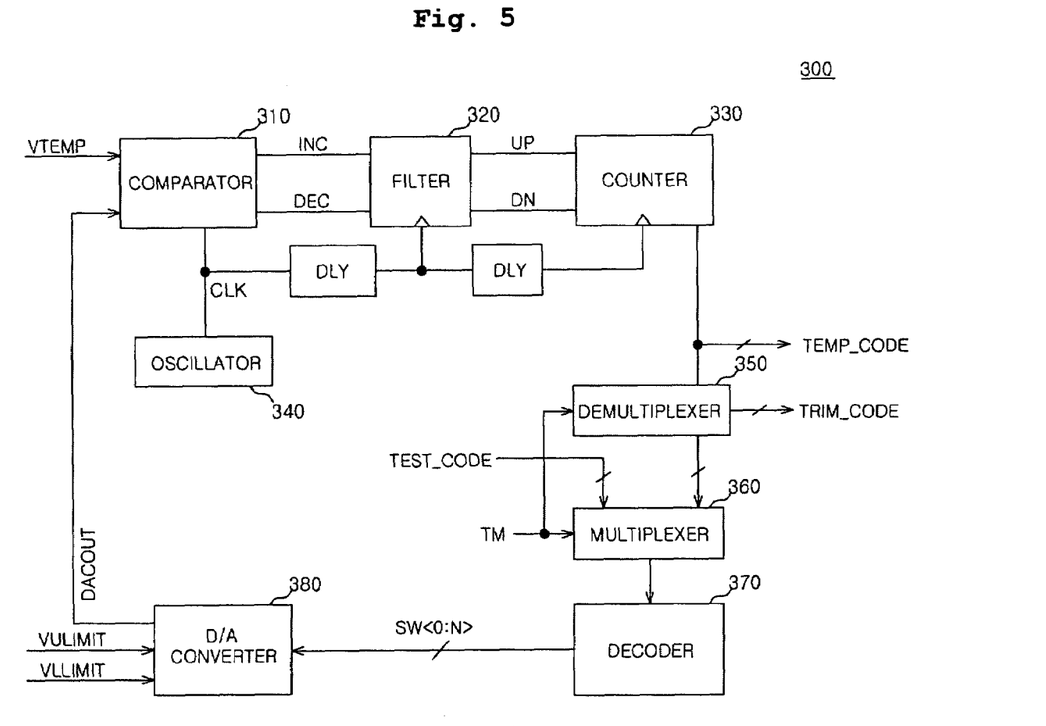
FIG. 5 is a block diagram of an exemplary A/D converter shown in FIG. 3.

As shown in FIG. 5, the A/D converter 300 may include a comparator 310, a filter 320, a counter 330, an oscillator 340, a demultiplexer 350, a multiplexer 360, a decoder 370, and a D/A converter 380.

The comparator 310 may compare a temperature voltage VTEMP and an analog voltage DACOUT output by the D/A converter 380 and outputs compared result signals INC and DEC. When values of the compared result signals INC and DEC fluctuate extremely, high frequency components flow into the compared result signals INC and DEC due to an external noise. Therefore, the filter 320 may intercept the output of the compared result signals INC and DEC. Meanwhile, when the values of the compared result signals INC and DEC fluctuate rarely, that is, the compared result signals INC and DEC are low frequency components in which the external noise components do not flow, the filter 320 outputs the compared result signals INC and DEC as counting signals UP and DN for performing up counting and down counting by the counter 330. The counter 330 increases or decreases a value of an initial temperature code TEMP_CODE (for example, 100000) according to the counting signals UP and DN and outputs it. The oscillator 340 may generate a clock signal having a predetermined cycle and supplies it to the filter 320 and the counter 330 through a delay element DLY. In accordance with the first test mode signal TM, the demultiplexer 350 may output the temperature code TEMP_CODE as the adjustment code TRIM_CODE to the temperature detecting circuit 500 or output the temperature code TEMP_CODE to the multiplexer 360. The multiplexer 360 may output the test code signal TEST_CODE or the temperature code TEMP_CODE according to the first test mode signal TM. The decoder 370 may output a decoding signal SW<0:N> that is obtained by decoding the output of the multiplexer 360. The D/A converter 380 may convert the decoding signal SW<0:N> into the analog voltage DACOUT in a range of the second reference voltages VULIMIT and VLLIMIT and outputs it.

Figure 6:
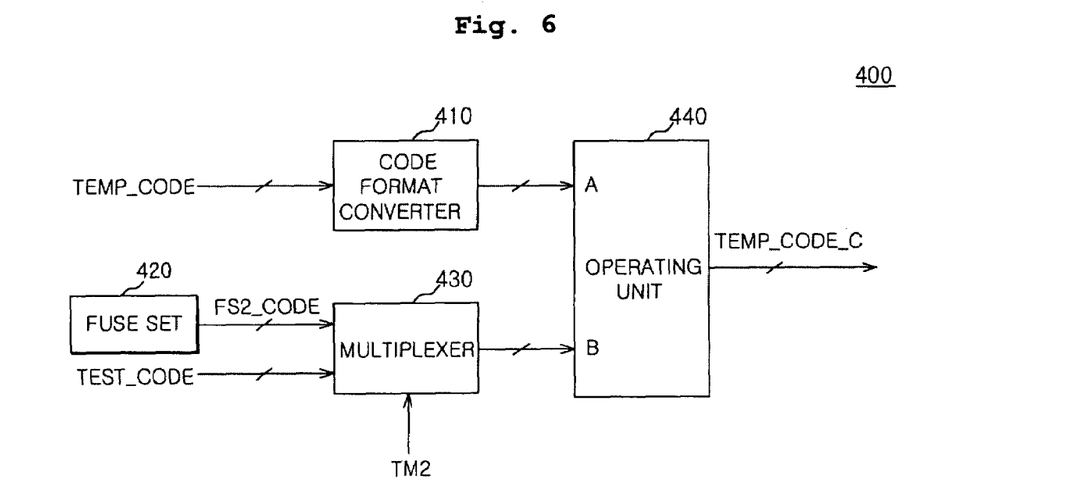
FIG. 6 is a block diagram of an exemplary temperature data correcting unit shown in FIG. 3.

As shown in FIG. 6, the exemplary temperature data correcting unit 400 may include a code format converter 410, a fuse set 420, a multiplexer 430, and an operating unit 440.

The code format converter 410 may include a logic circuit that converts input data into two's complement, and converts a format of a temperature code TEMP_CODE into a format of two's complement by using the logic circuit such that the temperature code TEMP_CODE can be used outside the circuit for outputting temperature data.

The fuse set 420 may include a plurality of fuses, and perform fuse cutting according to the correction code FS2_CODE that is generated through a second test mode.

In accordance with a control signal, that is, the second test mode signal TM2, the multiplexer 430 may select either the correction code FS2_CODE or the test code signal TEST_CODE set in the fuse set 420 and output it.

The operating unit 440 may include a subtraction logic circuit, and subtract the output of the multiplexer 430 from the output of the code format converter 410 and output a second temperature code TEMP_CODE_C.

An exemplary method of outputting temperature data of the semiconductor memory apparatus according to an embodiment of the present invention that has the above-described structure will now be described.

In embodiments of the invention, during a first test mode interval that uses the first test mode signal TM, the analog voltages, that is, the second reference voltages VULIMIT and VLLIMIT are adjusted by controlling the A/D converter 300 so as to perform primary correction by which the possibility of an error of the temperature code TEMP_CODE can be minimized. Further, during a second test mode interval that uses the second test mode signal TM2, the temperature data correcting unit 400 is controlled such that secondary correction for adjusting the value of the temperature code TEMP_CODE is performed so as to remove any possible error of the temperature code TEMP_CODE remaining after performing the primary correction.

The first test mode signal TM is enabled during the first test mode interval but is disabled during the other intervals. Meanwhile, the second test mode signal TM2 is enabled during the second test mode interval but is disabled during the other intervals.

For example, if the error in temperature is about 20° C. in the case where the correction is not made, the error in temperature is reduced to be less than 5° C. through the primary correction, and the error in temperature may be completely removed through the secondary correction.

In embodiments of the invention, the primary correction and the secondary correction may be selectively performed. That is, the secondary correction may be performed after the primary correction is performed. Alternatively, only the secondary correction may be performed or only the primary correction may be performed. Each correction method may be selectively used according to the operation characteristics of the temperature detecting circuit 500 and the A/D converter 300. However, preferably that both the primary correction and the secondary correction are performed so as to remove the error of the circuit of outputting temperature data.

Accordingly, a description will now be given of the exemplary operation of outputting temperature data in a general operation mode after completing each of the primary correction, the secondary correction, and the primary and secondary corrections.

First, an example of the primary correction method in the first test mode interval will be described.

The temperature sensor 110 of the temperature detecting circuit 500 of FIG. 3 outputs the temperature voltage VTEMP according to the internal temperature of the semiconductor memory apparatus and the first reference voltage VREF. At this time, since the first test mode signal TM is enabled, the multiplexer 510 outputs the adjustment code TRIM_CODE output by the A/D converter 300 to the voltage adjusting unit 120. Accordingly, the voltage adjusting unit 120 outputs the second reference voltages VULIMIT and VLLIMIT at the voltage levels set according to the adjustment code TRIM_CODE. At this time, the adjustment code TRIM_CODE has an initial value of the temperature code TEMP_CODE of the A/D converter 300.

The A/D converter 300 shown in FIG. 5 performs a tracking operation for searching the temperature code TEMP_CODE corresponding to the temperature voltage VTEMP by using the temperature voltage VTEMP and the second reference voltages VULIMIT and VLLIMIT.

Since the first test mode signal TM is enabled, the multiplexer 360 selects the test code signal TEST_CODE instead of the temperature code TEMP_CODE and outputs it to the decoder 370. Furthermore, the demultiplexer 350 selects the temperature code TEMP_CODE as the adjustment code TRIM_CODE and outputs it to the multiplexer 510 shown in FIG. 3. The test code signal TEST_CODE may be one of the plurality codes that may be set in advance to correspond to individual temperatures, and allow the first test mode to progress at the temperature corresponding to the test code signal TEST_CODE.

The variable resistors R9 and R10 of the voltage adjusting unit 120 shown in FIG. 4 are adjusted to have resistance values according to the adjustment code TRIM_CODE. As a result, the voltage levels of the second reference voltages VULIMIT and VLLIMIT are adjusted.

The A/D converter 300 performs the tracking operation while changing the temperature code TEMP_CODE by using the second reference voltages VULIMIT and VLLIMIT whose voltage levels have been adjusted.

If the temperature voltage VTEMP and the analog voltage DACOUT become the same and the tracking operation is completed, the fuse of the fuse set 130 shown in FIG. 3 is cut to correspond to the adjustment code TRIM_CODE of when the tracking operation is completed, and thus the primary correction is completed.

If the primary correction is completed and the first test mode is completed, the multiplexer 510 shown in FIG. 3 selects the fuse code FS_CODE output by the fuse set 130 and outputs it to the voltage adjusting unit 120. Furthermore, the demultiplexer 350 shown in FIG. 5 outputs the temperature code TEMP_CODE to the multiplexer 360, and the multiplexer 360 selects the temperature code TEMP_CODE instead of the test code signal TEST_CODE and outputs it to the decoder 370.

An example of the secondary correction method in the second test mode interval will now be described.

The temperature sensor 110 of the temperature detecting circuit 500 of FIG. 3 outputs the temperature voltage VTEMP according to the internal temperature of the semiconductor memory apparatus and the first reference voltage VREF. At this time, since the first test mode signal TM is enabled, the multiplexer 510 outputs the fuse code FS_CODE output by the fuse set 130 to the voltage adjusting unit 120. Accordingly, the voltage adjusting unit 120 outputs the second reference voltages VULIMIT and VLLIMIT at the voltage levels set according to the fuse code FS_CODE.

The A/D converter 300 shown in FIG. 5 performs a tracking operation for searching the temperature code TEMP_CODE corresponding to the temperature voltage VTEMP by using the temperature voltage VTEMP and the second reference voltages VULIMIT and VLLIMIT.

Since the first test mode signal TM is disabled, the demultiplexer 350 outputs the temperature code TEMP_CODE to the multiplexer 510 of FIG. 3. Furthermore, the multiplexer 360 selects the temperature code TEMP_CODE instead of the test code signal TEST_CODE and outputs it to the decoder 370.

When the temperature voltage VTEMP and the analog voltage DACOUT become the same and the tracking operation is completed, the A/D converter 300 outputs the temperature code TEMP_CODE of when the tracking operation is completed to the temperature data correcting unit 400.

The code format converter 410 of the temperature data correcting unit 400 shown in FIG. 6 converts a format of the temperature code TEMP_CODE into a format of the two's complement such that the temperature code TEMP_CODE can be used outside the circuit for outputting temperature data. An example of this method will be described in detail below.

The temperature code TEMP_CODE that is output by the A/D converter 300 has the number of bits smaller than the number of bits that are actually needed outside the circuit for outputting temperature data so as to minimize a signal processing load in the circuit for outputting temperature data. Furthermore, the temperature code TEMP_CODE that is output by the A/D converter 300 represents a temperature value, and the temperature code TEMP_CODE that is actually needed outside the circuit for outputting temperature data represents the difference between a specified temperature and a current temperature. The number of bits and a conversion format may be changed, for example, according to regulations, such as JEDEC (Joint Electron Device Engineering Council).

The temperature data correcting unit 400 changes the number of bits of the temperature code TEMP_CODE that is output by the A/D converter 300, converts the temperature code TEMP_CODE into a format of the two's complement, and outputs it to the operating unit 440.

It is assumed for this example that the temperature code TEMP_CODE output by the A/D converter 300 is for example, 6 bits, 8 bits are needed outside the circuit for outputting temperature data, and a specified temperature is at 45° C.

The code format converter 410 adds two bits, that is, a sign bit and a dummy bit to the temperature code TEMP_CODE output by the A/D converter 300, and converts the temperature code TEMP_CODE into a format of the two's complement. At this time, the sign bit is used to represent a sign, and the dummy bit is a bit that is added to prepare for a code extension.

For example, when the current temperature is at 48° C., the temperature code TEMP_CODE should represent +3° C., and when the current temperature is at 42° C., the temperature code TEMP_CODE should represent −3° C. At this time, in order to represent the sign by a binary number, the sign bit may be added and the temperature code converted into the format of the two's complement.

Since the second test mode signal TM2 is enabled, the multiplexer 430 selects the test code signal TEST_CODE and outputs it to the operating unit 440.

The test code signal TEST_CODE is one of a plurality of codes that may be set in advance to correspond to individual temperatures, and may have the same format as the code output by the code format converter 410. It is assumed for this example that the second test mode progresses at the temperature corresponding to the test code signal TEST_CODE and the temperature as the specified temperature is at 45° C.

The operating unit 440 subtracts the output of the multiplexer 430 from the output of the code format converter 410 and outputs the second temperature code TEMP_CODE_C.

The second test mode progresses at the specified temperature of 45° C., and the test code signal TEST_CODE is a code that has a format of the two's complement and corresponds to the temperature 45° C. Accordingly, if there is no error in the temperature code TEMP_CODE, the code format converter 410 outputs a code in a format of the two's complement that corresponds to the temperature of 45° C. Therefore, the operating unit 440 outputs a code (00000000) in which the error corresponds to 0° C.

However, When the error (for example, +2° C.) exists in the temperature code TEMP_CODE, the code format converter 410 outputs a code in a format of the two's complement that corresponds to the temperature of 47° C. The operating unit 440 outputs a code (00000010) that corresponds to the temperature of +2° C.

The error in the temperature code TEMP_CODE continuously acts as an offset even in a general operation mode.

The fuse of the fuse set 420 is cut to correspond to the second temperature code TEMP_CODE_C output by the operating unit 440, such that the correction code FS2_CODE is stored in the fuse set 420. In this way, the secondary correction is completed.

If the secondary correction is completed and the second test mode is completed, the multiplexer 430 selects the correction code FS2_CODE of the fuse set 420 and outputs it to the operating unit 440.

If the primary and secondary corrections performed by the first and second test modes are completed and the mode enters the general operation mode, the temperature detecting circuit 500 shown in FIG. 3 outputs the second reference voltages VULIMIT and VLLIMIT by using the temperature voltage VTEMP and the fuse code FS_CODE that is stored in the fuse set 130 through the primary correction.

The A/D converter 300 converts the temperature voltage VTEMP into the temperature code TEMP_CODE by using the second reference voltages VULIMIT and VLLIMIT, and outputs it.

The error may be corrected or a minute error may remain in the temperature code TEMP_CODE.

The temperature data correcting unit 400 outputs the second temperature code TEMP_CODE_C that is obtained by removing the minute error from the temperature code TEMP_CODE.

A system outside the semiconductor memory apparatus knows a specified temperature according to a predetermined regulation. Accordingly, the system can know the current temperature by reading the second temperature code TEMP_CODE_C indicating the difference between the specified temperature and the current temperature.

It will be apparent to those skilled in the art that various modifications and changes may be made without departing from the scope and spirit of the invention. Therefore, it should be understood that the above embodiments are not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

The circuit and method of outputting temperature data of the semiconductor memory apparatus according to an embodiment of the present invention may achieve the following effects.

First, an output error in a wide range is removed by performing the primary correction on the analog voltages and an output error in a narrow range is removed by performing the secondary correction on the temperature code. Accordingly, it is possible to output the temperature data in which the output error is reliably removed and may be completely removed.

Second, the primary correction on the analog voltages and the secondary correction on the temperature code are automatically performed by the test modes, and a repetitive output monitoring process does not need to be performed, which simplifies the correction process and reduces the amount of time required to perform the correction process.

What is claimed is:

1. A circuit for outputting temperature data of a semiconductor memory apparatus, the circuit comprising:
    a temperature detecting circuit configured to generate a temperature voltage corresponding to a change in temperature and outputs the temperature voltage;
    an A/D converter configured to convert the temperature voltage into a first temperature code and outputs the first temperature code; and
    a temperature data correcting unit configured to output a second temperature code obtained by correcting an error of the first temperature code using a correction code.

2. The circuit of claim 1,
    wherein the temperature detecting circuit includes:
    a temperature sensor that outputs the temperature voltage, which is inversely proportional to an internal temperature of the semiconductor memory apparatus, and a first reference voltage which is constant without depending on the change in temperature;
    a voltage adjusting unit including a plurality of resistors that distributes the first reference voltage and that outputs second reference voltages for determining an upper limit and a lower limit of the temperature voltage; and
    a fuse set that includes a plurality of fuses, and outputs a fuse code for adjusting resistance values of the plurality of resistors according to cutting states of the fuses.

3. The circuit of claim 2,
    wherein the temperature sensor includes:
    a temperature-proportional current generating unit that generates a current, which is proportional to the change in temperature, through a plurality of current paths;
    a temperature voltage output unit that outputs the temperature voltage corresponding to the change in temperature based on a temperature coefficient characteristic voltage of the temperature-proportional current generating unit;
    a temperature-inversely proportional current generating unit that generates a current, which is inversely proportional to the change in temperature, through the plurality of current paths; and
    a current/voltage converter that generates the first reference voltage, which is constant without depending on the change in temperature, by using the current generated by the temperature-proportional current generating unit and the current generated by the temperature-inversely proportional current generating unit.

4. The circuit of claim 2,
    wherein the voltage adjusting unit includes:
    a first transistor coupled to a power supply terminal;
    a first distribution resistor coupled between the first transistor and a ground terminal;

a first current controller that controls the first transistor based on a voltage distributed by the first distribution resistor and the first reference voltage;
a second transistor coupled to the power supply terminal;
a second distribution resistor that is connected between the second transistor and the ground terminal; and
a second current controller that controls the second transistor by using a voltage at a connecting node between the first transistor and the first distribution resistor and a voltage distributed by the second distribution resistor.

5. The circuit of claim 1,
wherein the A/D converter includes:
a comparator that compares the temperature voltage and an internal analog voltage so as to output a compared result;
a counter that increases or decreases the first temperature code according to the compared result and outputs the first temperature code;
a multiplexer that outputs a test code or the first temperature code according to a test mode signal;
a decoder that outputs a decoding signal obtained by decoding the output of the multiplexer; and
a D/A converter that converts the decoding signal into the internal analog voltage and outputs it.

6. The circuit of claim 5, further comprising:
a filter that blocks a high frequency component of the compared result and outputs the compared result; and
an oscillator that supplies a clock signal for performing operations of the A/D converter.

7. The circuit of claim 1,
wherein the temperature data correcting unit includes;
a code format converter that converts a format of the first temperature code into a format that is used outside the circuit for outputting temperature data to provide an output;
a fuse set that sets the correction code;
a multiplexer that selects and outputs either the correction code or a test code set in the fuse set in accordance with a predetermined control signal; and
an operating unit that outputs the second temperature code by using the output of the code format converter and the output of the multiplexer.

8. A circuit for outputting temperature data of a semiconductor memory apparatus, the circuit comprising:
a temperature detecting circuit configured to generate a temperature voltage corresponding to a change in temperature and outputs the temperature voltage, and corrects an output voltage level according to an adjustment code input from outside the circuit;
an A/D converter configured to convert the temperature voltage into a first temperature code and outputs the first temperature code, and outputs the adjustment code to the temperature detecting circuit in accordance with a predetermined control signal; and
a temperature data correcting unit configured to output a second temperature code obtained by correcting an error of the first temperature code using a correction code.

9. The circuit of claim 8,
wherein the temperature detecting circuit includes:
a temperature sensor that outputs the temperature voltage which is inversely proportional to an internal temperature of the semiconductor memory apparatus and a first reference voltage which is constant without depending on the change in temperature; and
a voltage adjusting unit including a plurality of resistors that distributes the first reference voltage by using and that outputs second reference voltages for determining an upper limit and a lower limit of the temperature voltage, and adjusts voltage levels of the second reference voltages according to the adjustment code.

10. The circuit of claim 9,
wherein the temperature sensor includes:
a temperature-proportional current generating unit that generates a current, which is proportional to the change in temperature, through a plurality of current paths;
a temperature voltage output unit that outputs the temperature voltage corresponding to the change in temperature based on a temperature coefficient characteristic voltage of the temperature-proportional current generating unit;
a temperature-inversely proportional current generating unit that generates a current, which is inversely proportional to the change in temperature, through the plurality of current paths; and
a current/voltage converter that generates the first reference voltage, which is constant without depending on the change in temperature, by using the current generated by the temperature-proportional current generating unit and the current generated by the temperature-inversely proportional current generating unit.

11. The circuit of claim 10,
wherein the temperature-proportional current generating unit includes:
a first transistor group that includes a plurality of transistors, each of which has a different size and is coupled to a power supply terminal;
a second transistor group that includes transistors that are coupled between a portion of the plurality of transistors of the first transistor group and a ground terminal and have negative temperature coefficient characteristics; and
a current controller that controls the first transistor group based on a voltage applied to the transistors of the second transistor group.

12. The circuit of claim 11,
wherein the current controller includes a differential amplifier.

13. The circuit of claim 11,
wherein the transistors of the second transistor group operate as diodes, and voltages across the diodes have negative temperature coefficient characteristics.

14. The circuit of claim 10,
wherein the temperature voltage output unit includes:
a node that outputs the temperature voltage;
a transistor coupled between the node and a power supply terminal;
distribution resistors coupled between the node and a ground terminal; and
a current controller that controls the transistor based on a voltage distributed by the distribution resistors and an internal voltage of the temperature-proportional current generating unit.

15. The circuit of claim 14,
wherein the current controller includes a differential amplifier.

16. The circuit of claim 10,
wherein the temperature-inversely proportional current generating unit includes:
a plurality of transistors each having a different size and coupled to a power supply terminal; and
a current controller that controls the plurality of transistors by using a voltage according to a current flowing through one of the plurality of transistors and an internal voltage of the temperature-proportional current generating unit.

17. The circuit of claim 10,
wherein the current/voltage converter includes a resistive element that is commonly coupled to two current paths in which a total current between a current flowing through one of the current paths of the temperature-proportional current generating unit and a current flowing through one of the current paths of the temperature-inversely proportional current generating unit is constant without depending on the change in temperature.

18. The circuit of claim 9,
wherein the voltage adjusting unit includes:
a first transistor coupled to a power supply terminal;
a first distribution resistor coupled between the first transistor and a ground terminal;
a first current controller that controls the first transistor by using a voltage distributed by the first distribution resistor and the first reference voltage;
a second transistor coupled to the power supply terminal;
a second distribution resistor coupled between the second transistor and the ground terminal; and
a second current controller that controls the second transistor based on a voltage at a node between the first transistor and the first distribution resistor and a voltage distributed by the second distribution resistor.

19. The circuit of claim 18,
wherein the first current controller and the second current controller each include a differential amplifier.

20. The circuit of claim 18,
wherein the first distribution resistor and the second distribution resistor each include at least one variable resistor whose resistance value varies according to the adjustment code.

21. The circuit of claim 11,
wherein the current controller includes a differential amplifier.

22. The circuit of claim 9, further comprising:
a fuse set that includes a plurality of fuses and outputs a fuse code for adjusting resistance values of the plurality of resistors according to cutting states of the fuses; and
a multiplexer that selects either the fuse code or the adjustment code in accordance with a control signal and outputs it to the voltage adjusting unit.

23. The circuit of claim 22,
wherein the control signal is a test mode signal.

24. The circuit of claim 8,
wherein the A/D converter includes:
a comparator that compares the temperature voltage and an internal analog voltage to output a compared result;
a counter that increases or decreases the first temperature code according to the compared result and outputs the first temperature code;
a demultiplexer that outputs the first temperature code as the adjustment code to the temperature detecting circuit or outputs the first temperature code to the A/D converter in accordance with a test mode signal;
a multiplexer that outputs a test code or the first temperature code in accordance with the test mode signal;
a decoder that outputs a decoding signal obtained by decoding the output of the multiplexer; and
a D/A converter that converts the decoding signal into the internal analog voltage and outputs the internal analog voltage.

25. The circuit of claim 24, further comprising:
a filter that blocks a high frequency component of the compared result to obtain a filtered compared result and outputs the filtered compared result to the counter as the compared result; and
an oscillator that supplies a clock signal for performing operations of the A/D converter.

26. The circuit of claim 8,
wherein the temperature data correcting unit includes;
a code format converter that converts a format of the first temperature code into a format that is used outside the circuit for outputting temperature data to provide an output;
a fuse set that sets the correction code;
a multiplexer that selects and outputs either the correction code or a test code set in the fuse set in accordance with a predetermined control signal; and
an operating unit that outputs the second temperature code based on the output of the code format converter and the output of the multiplexer.

27. The circuit of claim 26,
wherein the code format converter includes a logic circuit that converts input data into two's complement.

28. The circuit of claim 26,
wherein the control signal is a test mode signal.

29. The circuit of claim 26,
wherein the operating unit includes a logic circuit that subtracts two input data.

30. A method of outputting temperature data of a semiconductor memory apparatus, the semiconductor memory apparatus including a temperature detecting circuit that outputs a temperature voltage corresponding to a change in temperature and a reference voltage setting a range for converting the temperature voltage into a first temperature code and an A/D converter that converts the temperature voltage into the first temperature code by using the reference voltage, the method comprising:
creating a correction code for correcting an error of the first temperature code by using the first temperature code and a test code set in advance; and
outputting a second temperature code obtained by performing operations on the first temperature code and the correction code.

31. The method of claim 30,
wherein the test code is one of a plurality of codes that are set in advance so as to correspond to the change in temperature.

32. The method of claim 30,
wherein the creating of the correction code is performed during a test mode interval.

33. The method of claim 30,
wherein the creating of the correction code includes:
converting a format of the first temperature code into a same format as the test code; and
subtracting the test code from the first temperature code whose format has been converted so as to create the correction code.

34. The method of claim 33,
wherein the converting of the format of the first temperature code into the same format as the test code is performed by using two's complement.

35. The method of claim 30,
wherein the outputting of the second temperature code includes:
converting a format of the first temperature code into a same format as the test code; and outputting a temperature code, which is corrected by subtracting the correction code from the first temperature code whose format has been converted, as the second temperature code.

36. The method of claim 35,
wherein the converting of the format of the first temperature code into the same format as the test code is performed by using two's complement.

37. A method for outputting temperature data of a semiconductor memory apparatus, the semiconductor memory apparatus including a temperature detecting circuit that outputs a temperature voltage corresponding to a change in temperature and a reference voltage setting a range for converting the temperature voltage into a first temperature code, and an A/D converter that changes a value of a digital code such that an analog voltage, which is obtained by converting the temperature voltage into the digital code and converting the digital code by using the reference voltage, is the same as the temperature voltage, and outputs the digital code as the first temperature code, the method comprising;
changing the first temperature code such that an analog voltage obtained by converting a test code is the same as the temperature voltage, and changing the reference voltage by using the changed first temperature code such that the analog voltage is changed so as to correct the first temperature code; and
creating a correction code for correcting an error of the first temperature code by using the first temperature code and the test code and correcting the first temperature code as a second temperature code by using the correction code,
wherein the second temperature code is output by selectively performing the changing of the first temperature code and the changing of the reference voltage, and the creating of the correction code and the correcting of the first temperature code as the second temperature code.

38. The method of claim 37,
wherein the changing of the first temperature code and the changing of the reference voltage, and the creating of the correction code and the correcting of the first temperature code as the second temperature code each are performed in a separate test mode.

39. The method of claim 37,
wherein the test code is one of codes that are set in advance so as to correspond to the change in temperature.

40. The method of claim 37,
wherein the creating of the correction code includes:
converting a format of the first temperature code into the same format as the test code; and
subtracting the test code from the first temperature code whose format has been converted so as to create the correction code.

41. The method of claim 40,
wherein the converting of the format of the first temperature code into the same format as the test code is performed by using two's complement.

42. The method of claim 37,
wherein the correcting of the first temperature code as the second temperature code includes:
converting a format of the first temperature code into the same format as the test code; and
subtracting the correction code from the first temperature code whose format has been converted so as to correct the first temperature code as the second temperature code.

43. The method of claim 42,
wherein the converting of the format of the first temperature code into the same format as the test code is performed by using two's complement.

* * * * *